United States Patent
Defever et al.

(10) Patent No.: US 6,220,016 B1
(45) Date of Patent: Apr. 24, 2001

(54) ROCKET ENGINE COOLING SYSTEM

(76) Inventors: Guido D. Defever, 1880 Wexport La., Commerce Township, MI (US) 48382; Robert S. Thompson, Jr., 5950 Rosewood Pkwy., White Lake, MI (US) 48383

( * ) Notice: Subject to any disclaimer, the term of this patent is extended or adjusted under 35 U.S.C. 154(b) by 0 days.

(21) Appl. No.: 09/522,817

(22) Filed: Mar. 10, 2000

Related U.S. Application Data

(60) Provisional application No. 60/123,621, filed on Mar. 10, 1999.

(51) Int. Cl.$^7$ .................................................. F02K 11/00
(52) U.S. Cl. ................................ 60/267; 60/259; 60/204
(58) Field of Search ............................ 60/267, 258, 259, 60/204, 240

(56) References Cited

U.S. PATENT DOCUMENTS

| | | | |
|---|---|---|---|
| H1234 | 10/1993 | Burgner | 246/60 |
| 2,479,776 | 8/1949 | Price | 261/60 |
| 2,479,777 | 8/1949 | Price | 261/60 |
| 2,508,420 | 5/1950 | Redding | 746/60 |
| 2,518,881 * | 8/1950 | Goddard | 60/258 |
| 2,637,973 * | 5/1953 | Lawrence, Jr. | 60/259 |
| 2,775,864 | 1/1957 | Karcher | 261/60 |
| 2,844,001 | 7/1958 | Alford | 40/138 |
| 2,866,313 | 12/1958 | Holl | 261/60 |
| 2,914,912 | 12/1959 | Woll | 261/60 |
| 3,002,340 | 10/1961 | Landerman | 246/60 |
| 3,286,473 | 11/1966 | Cowell | 258/60 |
| 3,307,359 * | 3/1967 | Cowell | 60/258 |
| 3,318,574 | 5/1967 | Tyler | 36/415 |
| 3,408,817 * | 11/1968 | Waltz et al. | 60/259 X |
| 3,413,810 | 12/1968 | Kaufmann | 258/60 |
| 3,440,821 * | 4/1969 | Waltz | 60/259 |
| 3,468,128 | 9/1969 | Schutz | 261/60 |
| 3,541,793 | 11/1970 | Schmidt | 204/60 |
| 3,577,735 | 5/1971 | Schmidt | 207/60 |
| 3,740,948 | 6/1973 | Kellett | 261/60 |
| 3,772,885 | 11/1973 | Munding | 207/60 |
| 3,788,069 | 1/1974 | Schmidt | 207/60 |
| 3,828,551 | 8/1974 | Schmidt | 204/60 |
| 3,882,676 | 5/1975 | Schmidt | 245/60 |
| 3,943,706 | 3/1976 | Grafwallner et al. | 204/60 |
| 4,369,920 * | 1/1983 | Schmidt | 60/267 X |
| 4,769,996 | 9/1988 | Barbeau | 745/60 |
| 4,870,825 | 10/1989 | Chapman | 745/60 |
| 4,879,874 | 11/1989 | Koyari et al. | 259/60 |
| 4,901,525 | 2/1990 | Beveridge et al. | 211/60 |
| 5,010,730 | 4/1991 | Knuth et al. | 246/60 |
| 5,012,640 | 5/1991 | Mirville | 246/60 |
| 5,224,713 | 7/1993 | Pope | 415/277 |
| 5,267,437 | 12/1993 | Foust | 206/60 |
| 5,323,602 | 6/1994 | Defever | |
| 5,765,361 | 6/1998 | Jones et al. | 204/60 |
| 5,842,665 | 12/1998 | McKinney et al. | 2/244 |

* cited by examiner

Primary Examiner—Charles G. Freay
Assistant Examiner—David J. Torrente
(74) Attorney, Agent, or Firm—Lyon P.C.

(57) ABSTRACT

A rocket engine comprises first and second combustion chambers with respective combustion chamber liners bounding respective annular passages, wherein the first combustion chamber discharges into the second, and the respective annular passages are in fluid communication with one another. A portion of the effluent from the first combustion chamber flows from the first combustion chamber to the second combustion chamber through the respective annular passages via orifices in the respective combustion chamber liners, so as to provide for effusion cooling of a surface of the second combustion chamber. The first combustion chamber preferably operates fuel rich, reducing the temperature of the effusion cooling gases, which may be further cooled by a portion of unburned fuel. A flow restriction such as a turbine between the first and second combustion chambers provides a pressure differential therebetween that induces flow of effusion cooling gases.

29 Claims, 5 Drawing Sheets

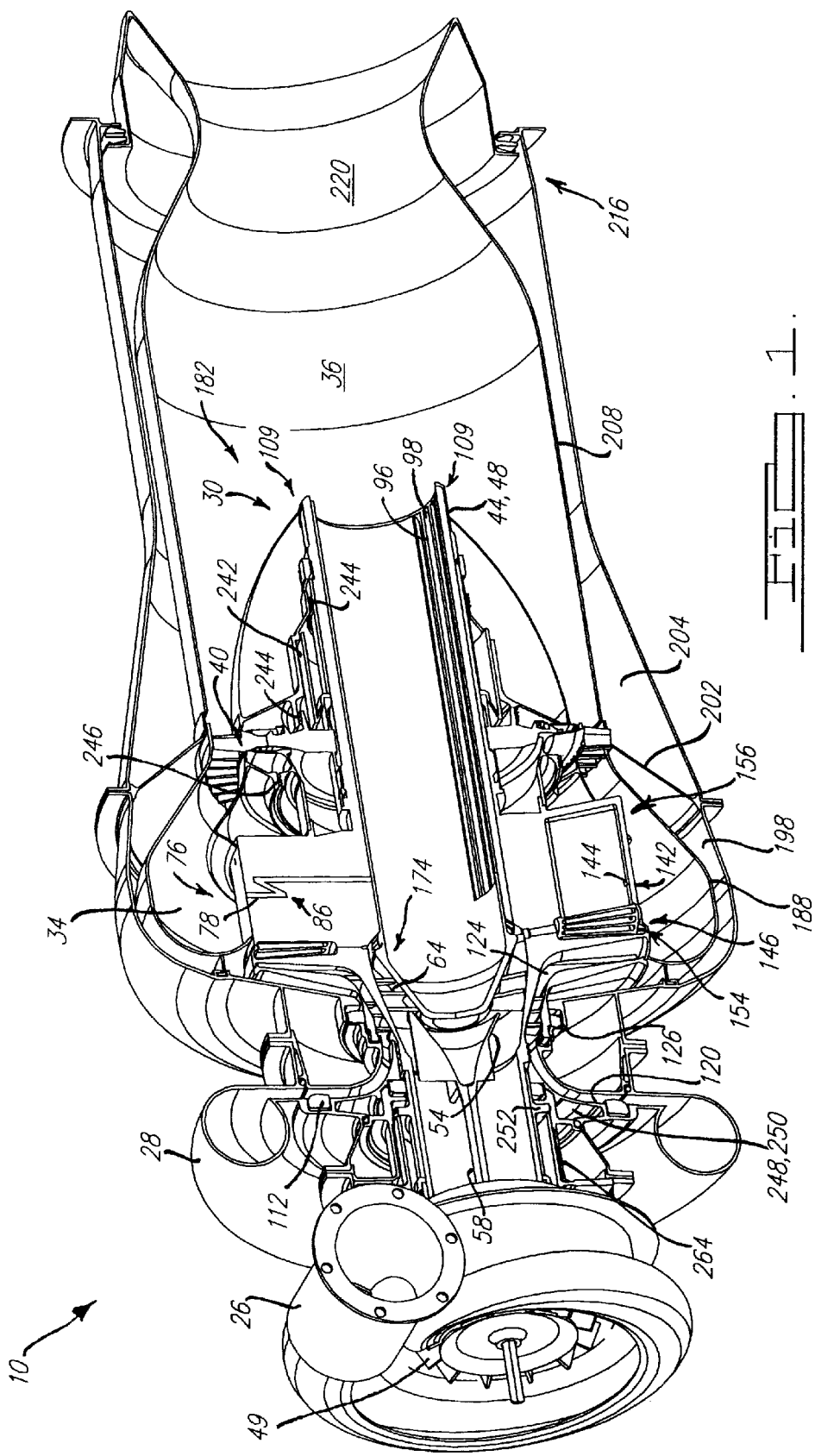

ROCKET ENGINE COOLING SYSTEM

CROSS-REFERENCE TO RELATED APPLICATIONS

The instant application claims the benefit of prior U.S. Provisional Application Ser. No. 60/123,621 filed on Mar. 10, 1999, which is incorporated herein by reference.

TECHNICAL ART

The present invention generally relates to fluid propellant rocket engines and more particularly to fluid propellant rocket engines that integrate as a single unit the turbomachinery for pumping the fluid propellant together with the main combustion chamber of the rocket.

BACKGROUND OF THE INVENTION

Liquid fuel rocket engines, for example as taught in U.S. Pat. Nos. 4,879,874, 4,901,525, and 5,267,437 generally employ turbomachinery that is distinct from the main rocket nozzle for pressurizing and/or gasifying the liquid propellants prior to injection into the main rocket nozzle. Furthermore, one or more of the propellant components may be adapted to cool the main rocket nozzle through a associated plumbing circuitry. Accordingly, such systems are generally costly and complex, and the added complexity tends to reduce reliability.

U.S. Pat. Nos. 3,541,793 and 3,577,735 teaches a turborocket engine wherein liquid propellants are pressurized by respective pumps that pressurize a liquid fuel and liquid oxidizer. One of the propellant components discharges first through the walls of the main combustion chamber for cooling purposes, and then into a precombustion chamber. A portion of the other propellant component is discharged in the precombustion chamber, and the remainder is discharged into the main combustion chamber. The effluent from the precombustion chamber drives a turbine that in turn drives the respective pumps. The effluent then discharges into the main combustion chamber. The discharge nozzles are stationary relative to the respective combustion chambers, which can result in temperature variations within the precombustion chamber than can be stressful to the turbine. Further, the use of liquid propellant for cooling the main combustion chamber increases cost, complexity and weight.

U.S. Pat. Nos. 4,769,996 and 4,870,825 teach rotary liquid fuel injection systems that incorporate rotary pressure traps, however these systems are incorporated into turbine engines that utilize a gaseous oxidizer. Neither of these patents teach a turborocket engine that provides for rotary injection of both fuel and oxidizer component.

U.S. Pat. No. 5,323,602 teaches an effusion cooling system for a gas turbine engine that uses air as the cooling medium. This patent does not teach a turborocket engine, nor does it teach the use of combustion gases from a precombustor for effusion cooling a main combustor.

SUMMARY OF THE INVENTION

The present invention overcomes the above-noted problems by providing a turborocket engine that integrates the functions usually associated with rocket propulsion main combustion chambers and the turbomachinery usually associated with the turbopumps used by liquid rocket engines into one unit, thereby eliminating most of the plumbing and cooling circuitry normally associated with liquid rocket engines. This results in a much lower cost and lower weight propulsion system than is provided by prior-art liquid rocket engines.

Liquid fuel and liquid oxidizer are provided from pressurized tanks at relatively low pressure to separate sections within a rotor system driven by a relatively low pressure ratio turbine that is powered the combustion effluent generated by a precombustor operated at a relatively rich fuel/oxidizer ratio such that the temperature of the partially combusted effluent can be tolerated by the turbine. The flow rates of liquid fuel and liquid oxidizer are controlled at the relatively low supply pressure with separate throttle control valves, which provides for improved control that is less costly and more reliable. Rotary pressure traps incorporated in the rotor system isolate the relatively low pressure outlets of the respective throttle control valves from the relatively high pressures of the precombustor and main combustor.

The rotor system imparts, by a centrifugal pumping means, rotational kinetic energy and centrifugal force to the liquid fuel and liquid oxidizer. The centrifugal pumping means comprises one or more longitudinal ribs or vanes on the inside surface of the outer wall of a hollow shaft portion with one or more discharge orifices in communication with one or more associated grooves formed between adjacent ribs or vanes. Generally the pressure drop across the discharge orifices is relatively small, and the discharge orifices are not necessarily filled with fluid during normal operation. Moreover, whereas there is generally a one-to-one relationship between grooves and discharge orifices, subject to the constraint of mechanical balance, either more than one discharge orifice, or no discharge orifices, may be in communication with a particular groove. Furthermore, whereas the discharge orifices are generally of uniform size and orientation, subject to the constraint of mechanical balance, different discharge orifices may be sized and oriented differently. The liquid is rotated by the ribs or vanes, and centrifugally accelerated through the discharge orifices, which imparts substantial radial and circumferential velocities to the injected liquids, thereby providing for complete mixing and distribution. The centrifugal pumping means of the present invention does not, however, incorporate a diffuser to convert kinetic energy back to pressure energy, as incorporated in many conventional centrifugal pumps. All of the liquid fuel and some of the liquid oxidizer is injected by rotary injection into the precombustor, and then mixed, vaporized, and partially combusted therein. The temperature of the effluent from the precombustor is controlled by the associated fuel/oxidizer mixture ratio. The rotary injection process provides for a more uniform temperature distribution within the associated toroidal combustion zones within the precombustor, thereby enabling the turbine to operate at a temperature closer to the material-dependent peak operating temperature.

Both the liquid fuel and the liquid oxidizer are centrifugally pumped. Accordingly, the rotor system incorporates concentric hollow sections, wherein the liquid oxidizer is supplied through and pumped from the center of a hollow main shaft, and the liquid fuel is pumped from an annular chamber concentric therewith. The elements of the centrifugal pumps, including the ribs/vanes and discharge orifices, are arranged and sized so as to not disturb the mechanical balance of the rotor system. However, the ribs/vanes and/or the discharge orifices may be non-uniformly spaced in accordance with this constraint.

A portion of the effluent from the precombustor is directed through the precombustor liner, over the outside of the main combustor liner, and into the main combustor through effusion cooling holes so as to cool the main combustor by effusion cooling. A portion of the fuel, either liquid or gaseous, may also be directed over the precombustor liner for cooling the precombustor, and then combined with the effluent stream used to cool the main combustor liner. Furthermore, a portion of the effusion cooling gases may be discharged in the main combustor so as to provide boundary layer cooling of the converging/diverging nozzle.

The relative amount of liquid oxidizer that is delivered to the precombustor and to the main combustor is set by the design of the liquid oxidizer distribution system within the main rotor system. The liquid oxidizer pump discharge is split at the pump exit, feeding the smaller portion of the flow to a rotating injection device which delivers the oxidizer to the precombustor. The rotating injection device also incorporates a rotary pressure trap to isolate the precombustor pressure from the main combustor pressure, thereby preventing the flow of precombustor gas therebetween through the rotary injection device. A portion of the liquid fuel is also fed into a similar rotating injection device proximate to the same axial plane, resulting in mixing and atomizing of the two liquids as they are slung from the shaft system. Combustion of the mixture occurs simultaneously with this mixing and atomization. Additional liquid fuel is injected into the precombustor to assist in mixing and to control the mixture ratio to achieve the proper temperature as the gasses reach the turbine. Accordingly, the fuel/oxidizer mixture ratio may be controlled within specific zones within the precombustor, which provides for improved bum characteristics.

An igniter, such as a high temperature torch, is used to initiate combustion in the precombustor, after which the combustion is continuous and self-sustaining. The heat of combustion in the precombustor vaporizes the injected liquid fuel and liquid oxidizer injected therein, including any liquid fuel used for cooling the precombustor and/or main combustor liners.

The majority of the effluent from the precombustor flows directly into the main combustor after driving the turbine. This effluent and the gases used for cooling the precombustor and/or main combustor are combined and combusted with the remainder of the liquid oxidizer that is fed through the center of the hollow shaft connecting the pump elements to the turbine, and is injected by rotary injection directly into the main combustor as it exists the shaft through a centrifugal pumping device. This high speed rotary injection atomizes the liquid oxidizer which rapidly vaporizes and completes the combustion of the hot fuel rich gasses exiting the turbine directly into the main combustor. The end of the hollow shaft that is exposed to the hot combustion gases of the main combustor may be adapted to provide for the cooling or venting thereof by the discharge of gaseous oxidizer therefrom. The end of the hollow shaft may also or alternatively be polished or coated to provide thermal insulation from the hot combustion gases. The final or overall fuel/oxidizer mixture ratio is adjusted in accordance with a particular objective function, such as maximum thrust subject to constraints on the relative size of the associated propellant tanks.

The present invention can alternately incorporate either a radial pump or an axial pump mounted on the outside of the shaft, prior to the precombustor, for pumping and injecting the liquid fuel into the turborocket engine. Furthermore, the liquid oxidizer pump can be located downstream of where the liquid oxidizer flow is divided between the precombustor and the main combustor.

Accordingly, one object of the present invention is to provide a lower cost turborocket engine.

A further object of the present invention is to provide a turborocket engine with improved reliability.

In accordance with these objectives, one feature of the present invention is that both the fuel and oxidizer are injected as liquids into the respective combustion chambers.

Another feature of the present invention is that both the fuel and oxidizer are injected as cryogenic liquids into the respective combustion chambers.

Yet another feature of the present invention is the incorporation of a precombustor and a main combustor with a turbine disposed therebetween, wherein the turbine drives a pumping means that pumps all of the liquid fuel and a portion of the liquid oxidizer into the precombustor, the fuel/oxidizer mixture ratio controlled such that the precombustor effluent temperature can be tolerated by the turbine, and the remainder of the liquid oxidizer is combined with the effluent from the precombustor/turbine for best overall combustion.

Yet another feature of the present invention is the incorporation of respective vapor core centrifugal pumps for pumping and injecting the liquid fuel and liquid oxidizer.

Yet another feature of the present invention is that the liquid fuel and liquid oxidizer are injected in the respective combustion chambers by rotary injection.

Yet another feature of the present invention is the incorporation of rotary pressure traps hat isolate the liquid propellants from the pressure of the combustion chambers.

Yet another feature of the present invention is the control of liquid fuel and liquid oxidizer at the relatively low associated supply pressures, as from associated pressurized tanks.

Yet another feature of the present invention is the effusion cooling of the main combustor with effluent from the precombustor.

The specific features of the present invention provide a number of associated advantages. One advantage of the present invention with respect to the prior art is that a substantial amount of plumbing and machinery associated with conventional liquid propellant rocket engines can be eliminated, thereby reducing cost and improving reliability.

These and other objects, features, and advantages of the instant invention will be more fully understood after reading the following detailed description of the preferred embodiment with reference to the accompanying drawings and viewed in accordance with the appended claims. While this description will illustrate the application of the present invention as a liquid propellant turborocket operating on liquid hydrogen and liquid oxygen, it will be understood by one with ordinary skill in the art that the present invention can also be applied to any liquid bi-propellant system comprising a liquid fuel and a liquid oxidizer.

BRIEF DESCRIPTION OF THE DRAWINGS

FIG. 1 illustrates an isometric cross-sectional view of a rocket engine in accordance with the present invention;

DETAILED DESCRIPTION OF THE PREFERRED EMBODIMENT(S)

Figure 2A:
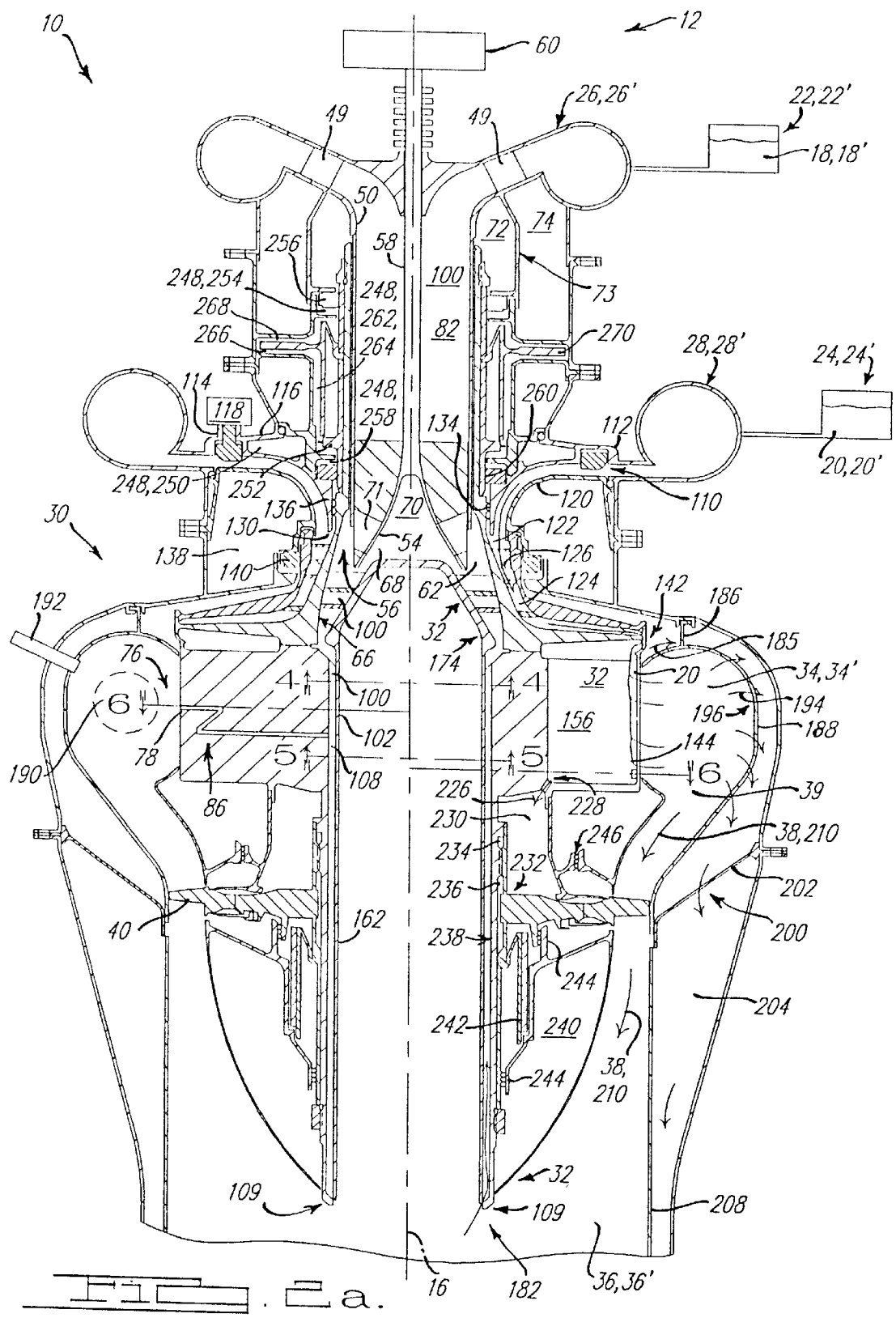
FIG. 2a illustrates a first cross-sectional view of a rocket engine in accordance with the present invention.
Figure 2B:
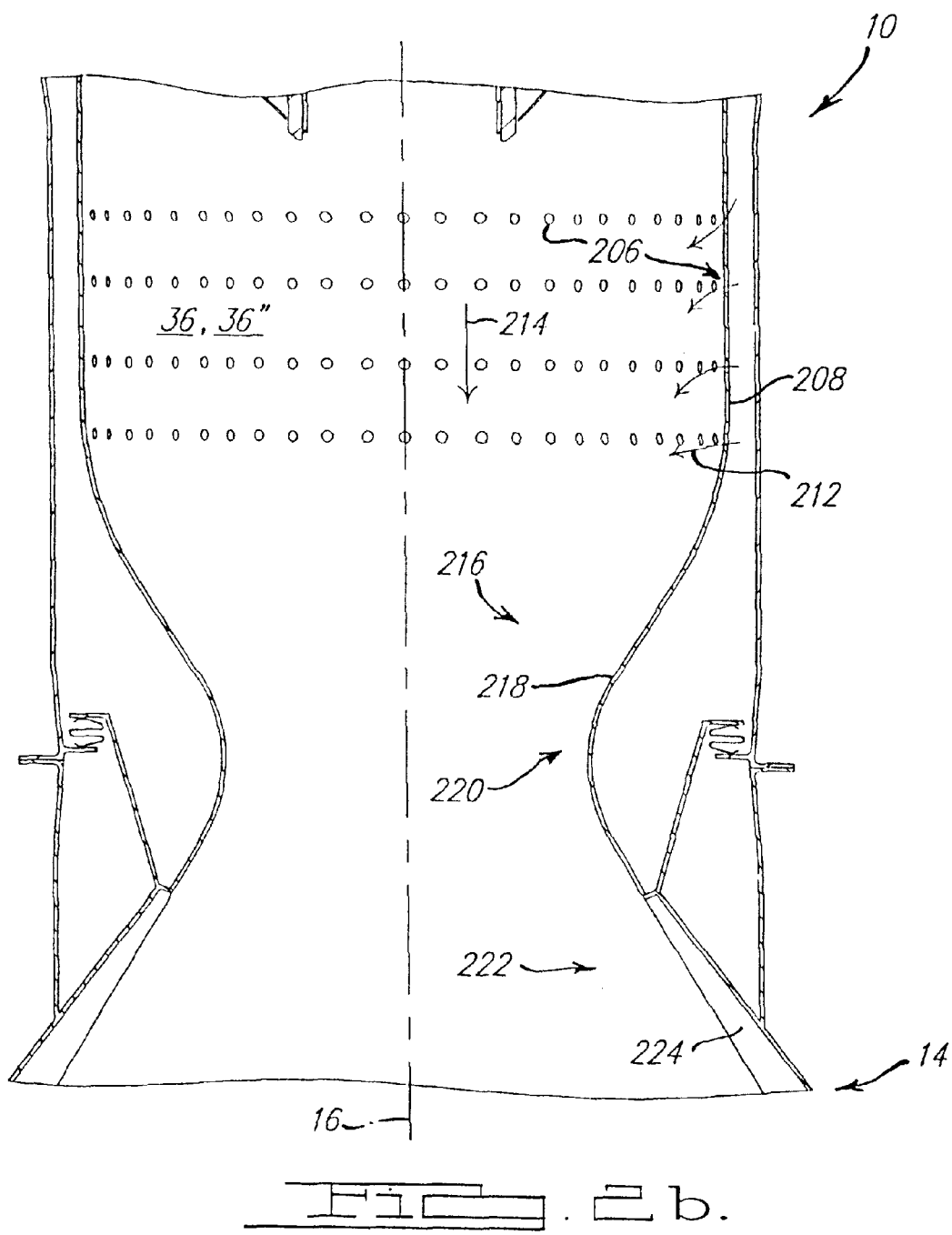
FIG. 2b illustrates a second cross-sectional view of a rocket engine in accordance with the present invention.

Referring to FIGS. 1, 2a and 2b, a rocket engine 10 with a first end 12 and a second end 14 directs thrust from the second end 14 along an axis 16. First 18' and second 20' propellant components, for example liquid oxygen 18 and liquid hydrogen 20 respectively, are fed from respective sources 22', 24', for example respective first and second pressurized tanks 22, 24, through respective first 26' and second 28' inlets, for example respective scrolls 26, 28, and into a single rotor system 30 that contains a pumping means 32 for pumping the liquid oxygen 18 and liquid hydrogen 20 into first 34' and second 36' combustion chambers, for example a precombustor 34 and a main combustor 36 respectively. At least a portion of the effluent 38 from the outlet 39 of the precombustor 34 drives a turbine 40 that rotates the rotor system 30. All, or most, of the hydrogen is fed to the precombustor 34 but the precombustor 34 receives only sufficient oxygen to raise its efflux temperature to a level that can be easily tolerated by the turbine 40. The hydrogen rich effluent 38 discharged by of the turbine 40, along with any hydrogen that bypasses the turbine 40, is fed to the main combustor 36 where the remainder of the oxygen is introduced so as to provide an overall fuel/oxidizer mixture ratio within the main combustor 36 appropriate for the particular fuel/oxidizer system, whereby the combustion within the main combustor 36 provides the very high temperatures normally associated with rocket engines. For example, in a liquid hydrogen ($LH_2$)/liquid oxygen ($LO_2$) system, the oxidizer/fuel mass ratio is preferably about 5.5:1, but could be any known mixture ratio or range of mixture ratios capable of supporting combustion. For example, a mixture ratio of 2.8:1 $LH_2$:$LO_2$ provides for the highest impulse, albeit with the associated disadvantage of requiring undesirably large liquid hydrogen storage tanks.

Figure 3:
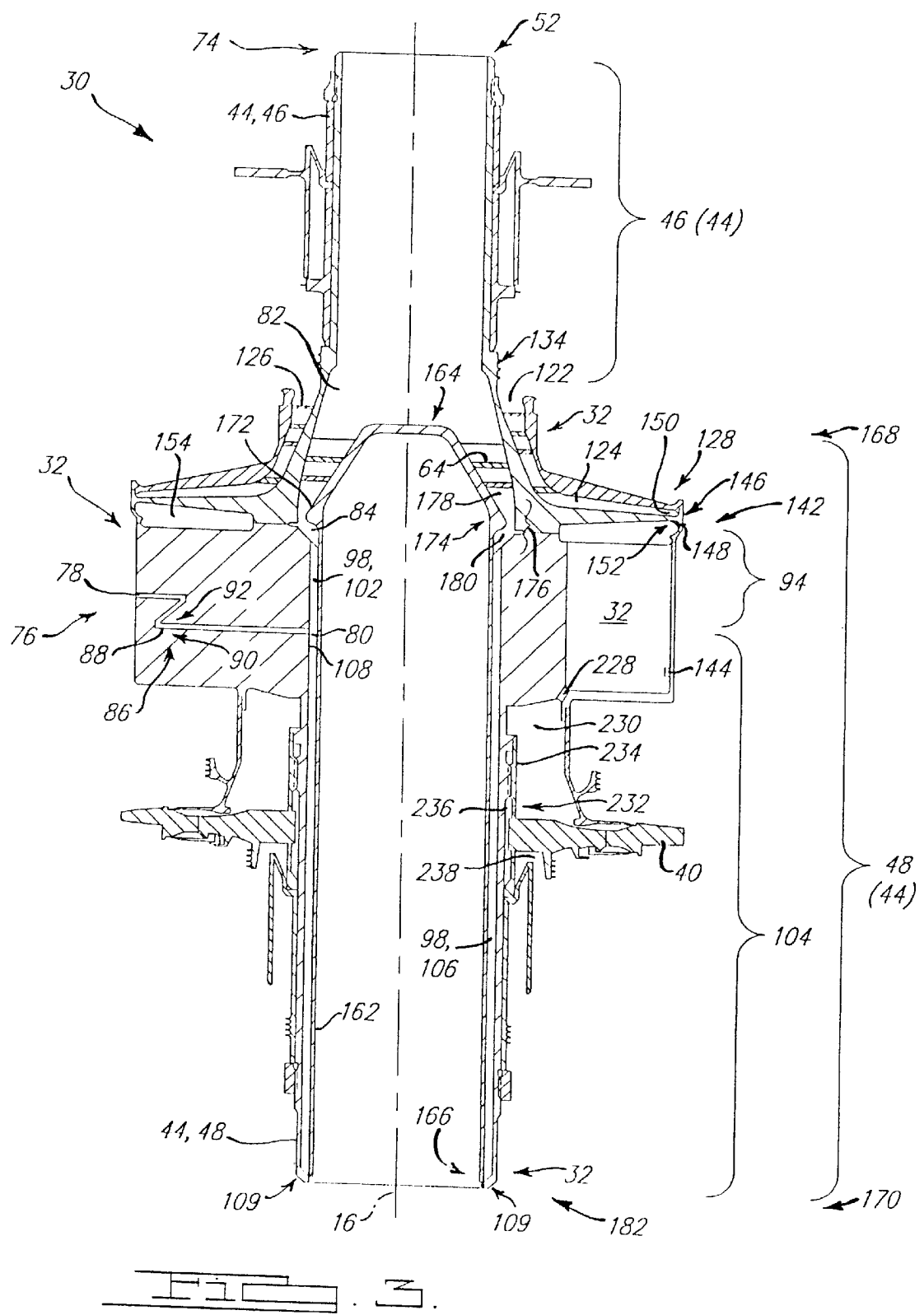
FIG. 3 illustrates a first cross-sectional view of a rotor system in accordance with the present invention.

Referring to FIG. 3, the rotor system 30 comprises a shaft 44 having first 46 and second 48 hollow shaft portions adjacent and coupled and open to one another. The inside diameter of at least a portion of the second hollow shaft portion 48 is greater than that of the first hollow shaft portion 46. Liquid oxygen 18 is fed from the oxygen tank 22 into the oxygen scroll 26 at the first end 12 of the rocket engine 10 at a pressure of about 30 psig, through a plurality of flow directing vanes 49, and into a stationary tube 50 that extends through and inside a first end 52 of the first hollow shaft portion 46. The total quantity of oxygen supplied to the rocket engine 10 is regulated by a moveable conical throttle element 54 forming a controlled first throttling restriction 56 that restricts the flow of oxygen from of the stationary tube 50. The conical throttle element 54 is positioned by a rod 58 actuated by a first controller 60 from the first end 12 of the rocket engine 10.

Liquid oxygen 18 passing through the first throttling restriction 56 is directed into an interior 62 of the second hollow shaft portion 48 of the rotating shaft 44, which contains a first inducer 64 comprising at least one screw-like vane that provides combined axial and rotational acceleration of the liquid oxygen 18 so as to induce the liquid oxygen 18 to rotate with the shaft 44, while minimizing the joule heating and resulting vaporization as a result of mechanical agitation by the inducing process. The rotation of the shaft 44 generates centrifugal forces that cause the liquid oxygen 18 to gravitate towards the inside surface 66 of the shaft 44 thereby driving any oxygen vapor 68 towards the center 70 of the shaft 44, which is vented by at least one vent duct 71 towards the outside of the stationary tube 50. Because the first hollow shaft portion 46 is smaller in inside diameter than the second hollow shaft portion 48, the centrifugal separation of liquid oxygen 18 and oxygen vapor 68 causes the rotating first hollow shaft portion 46 to fill with oxygen vapor 68, which discharges into a fixed first annular vent chamber 72, through a vent port 73, and into a fixed second annular vent chamber 74, from where the oxygen vapor 68 is vented from the rocket engine 10.

A first rotary injector 76 coupled to the shaft 44, particularly to the second hollow shaft portion 48, within the precombustor 34 comprises at least one first rotary orifice 78 in fluid communication with an inlet 80 and with the precombustor 34. The inlet 80 is in fluid communication with the oxygen scroll 26 that supplies liquid oxygen 18 through an associated fluid path in the respective interiors 82, 62 of the first 46 and second 48 hollow shaft portions. The first rotary orifice 78 rotates with the shaft 44 about the axis 16 thereof. The first rotary injector 76 further comprises at least one first rotary pressure trap 86 comprising a first fluid passage 88 having an inlet 90 and an outlet 92 in fluid communication there through along a length thereof. The first fluid passage 88 is adapted so that when rotated about the axis of rotation 16, a centrifugal acceleration at any point within the first fluid passage 88 is greater than a centrifugal acceleration at either the inlet 90 or the outlet 92 thereof.

Figures 4, 5:
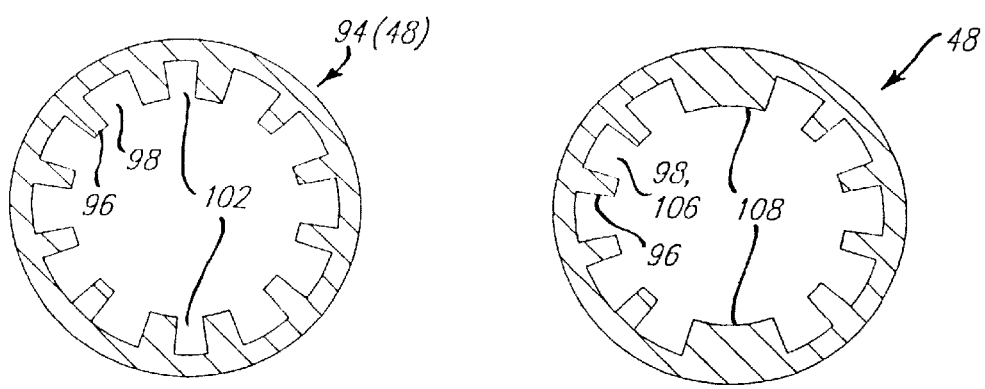
FIG. 4 illustrates a cross-sectional view of third hollow shaft portion of the present invention.
FIG. 5 illustrates a cross-sectional view of an annular dam portion of the present invention.

Referring to FIGS. 1 and 4, the second hollow shaft portion 48 further comprises a third hollow shaft portion 94 comprising a plurality of longitudinal ribs 96 and grooves 98 on the inside thereof. The longitudinal grooves 98 constitute a portion of a fluid passage 100 between the oxygen scroll 26 and the first rotary injector 76. For uniformly sized longitudinal grooves 98, each longitudinal groove 98 receives an equal flow of liquid oxygen 18 from the first inducer 64. However, the longitudinal grooves 98 may be non-uniformly sized—within the constraint of rotational balance,—resulting in corresponding nonuniform liquid oxygen flow rates within the respective longitudinal grooves 98. At least one first groove 102 is in fluid communication with the inlet 80 of the first rotary injector 76. The second hollow shaft portion 48 further comprises a fourth hollow shaft portion 104 into which at least one second groove 106 extends from the third hollow shaft portion 94 to fourth hollow shaft portion 104 along the inside thereof. Referring to FIG. 5, those first grooves 102 that do not extend into the fourth hollow shaft portion 102 are blocked at by associated annular dam segments 108 between the third 94 and fourth hollow shaft portions 104.

Liquid oxygen 18 flowing along the first grooves 102 discharges through the respective first rotary orifices 78 into the precombustor 34. The remaining liquid oxygen 18 flowing along the longitudinal grooves 98, particularly the second grooves 106, discharges through respective third rotary orifices 109 into the main combustor 36, wherein the relative flows of liquid oxygen 18 into the precombustor 34 and the main combustor 36 are adapted to control the mixture ratios in the respective combustion chambers, particularly so that the mixture in the precombustor 34 is substantially richer, and burns at a substantially lower temperature, than the mixture in the main combustor 36. This arrangement precludes the need for separate servo-control of liquid oxygen flow into the precombustor 34. Preferably, for each longitudinal groove 98 that is discharged through a first rotary orifice 78 into the precombustor 34, approximately five (5) longitudinal groove 98 discharge through the third rotary orifices 109 into the main combustor 36. The radial injection of liquid oxygen 18 from the rotating shaft 44 into both the precombustor 34 and the main combustor 36 provides for even circumferential distribution and atomization thereof therein.

Referring to FIGS. 1, 2a and 2b, liquid hydrogen 20 is delivered from the associated pressurized hydrogen tank 24 into the hydrogen scroll 28 at a pressure of approximately 15 psig. The liquid hydrogen 20 flows radially inward from the hydrogen scroll 28 through a second throttling restriction 110 controlled by throttle ring 112 that is positioned by at least one control rod 114 through the case 116 and connected to a second controller 118.

Downstream of the second throttling restriction 110, the liquid hydrogen 20 flows through a curved annular flow diverter 120 that redirects the flow from radially inward to axial. The curved annular flow diverter 120 may incorporate vanes to impart pre-swirl to the flow. The liquid hydrogen 20 discharges from the curved annular flow diverter 120 into the interior 122 of a annular duct 124 in the rotor system 30 and into a second inducer 126 contained therein and rotating therewith. The second inducer 126 comprises at least one screw-like vane that provides combined axial and rotational acceleration of the liquid hydrogen 20 so as to induce the liquid hydrogen 20 to rotate with the shaft 44, while minimizing the joule heating and resulting vaporization as a result of mechanical agitation by the inducing process. Downstream of the second inducer 126, the annular duct 124 expands in diameter, wherein centrifugal forces cause liquid hydrogen 20 within the annular duct 124 to gravitate towards the outermost region 128 thereof, thereby displacing hydrogen vapor 130 therein towards the interior 122 thereof.

A first labyrinth seal 134 disposed between the outside of the second hollow shaft portion 48 and the structure of the curved annular flow diverter 120 meters the leakage of hydrogen vapor 130 from the annular duct 124 through a first vent duct 136 into an third annular vent chamber 138 from where the hydrogen vapor 130 is vented from the rocket engine 10. A first seal 140, for example a carbon seal, operative between the outside of the rotating annular duct 124 and the fixed third annular vent chamber 138, seals against the leakage of hydrogen from the fixed annular flow diverter 120, around the rotating annular duct 124 and into the fixed third annular vent chamber 138.

Figure 6:
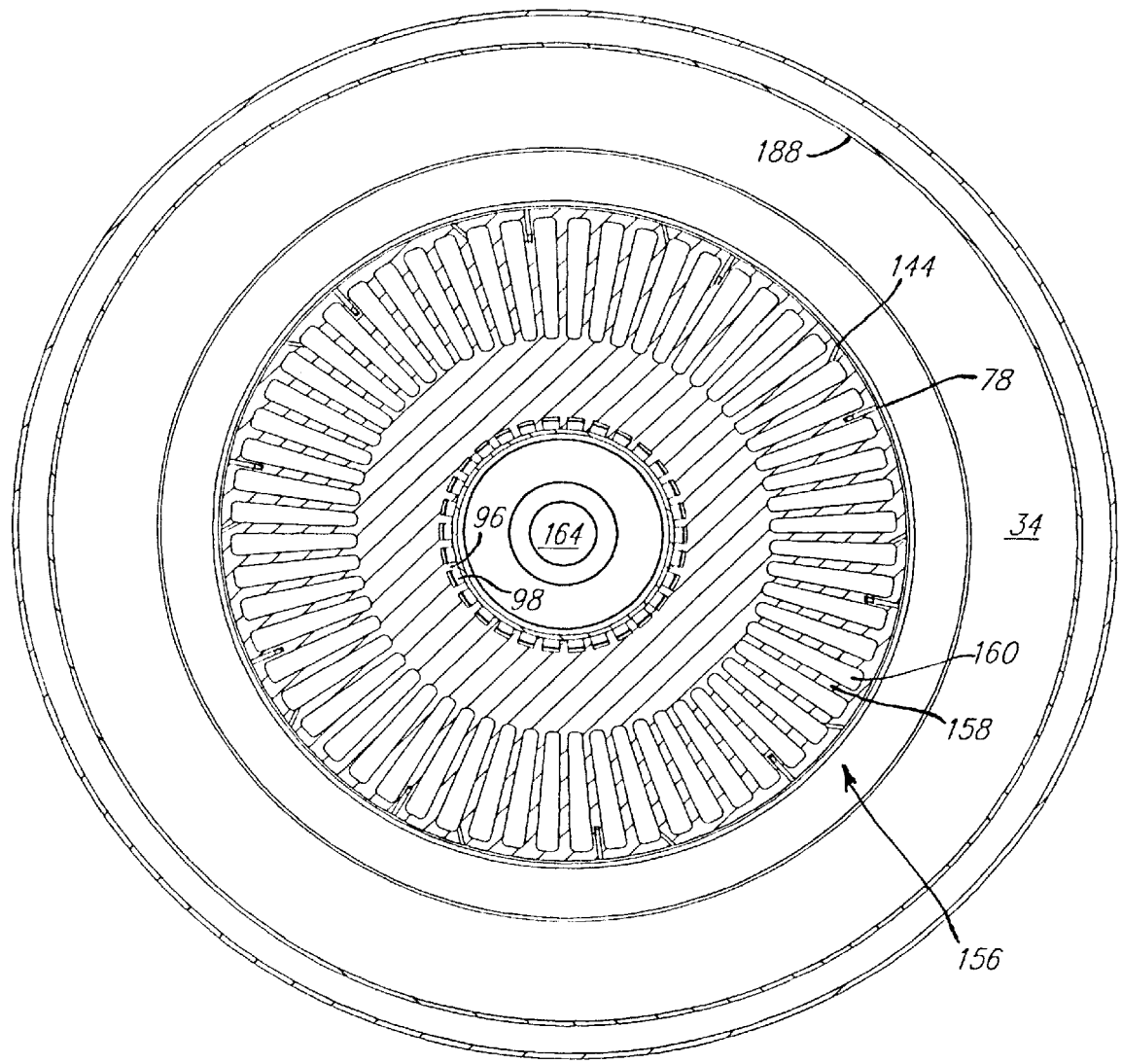
FIG. 6 illustrates a second cross-sectional view of a rotor system in accordance with the present invention.

The main liquid hydrogen flow is delivered outwardly from the rotating annular duct 124 into a second rotary injector 142 coupled to the shaft 44, particularly to the second hollow shaft portion 48, within the precombustor 34. The second rotary injector 142 comprises at least one second rotary orifice 144 in fluid communication with the annular duct 124 and with the precombustor 34. The second rotary orifice 144 rotates with the shaft 44 about the axis 16 thereof. The second rotary injector 142 further comprises at least one second rotary pressure trap 146 comprising a second fluid passage 148 having an inlet 150 and an outlet 152 in fluid communication there through along a length thereof. The second fluid passage 148 is adapted so that when rotated about the axis of rotation 16, a centrifugal acceleration at any point within the second fluid passage 148 is greater than a centrifugal acceleration at either the inlet 150 or the outlet 152. Referring to FIGS. 2a, 3 and 6, each outlet 152 of each second rotary pressure trap 146 is in fluid communication with an annular manifold 154, which is in fluid communication with an annular chamber 156 partitioned by a plurality of radial vanes 158 into a plurality of radial chambers 160, at least some of which discharge into respective second rotary orifices 144.

In operation, the radial vanes 158 cause liquid hydrogen 20 within the annular chamber 156 to rotate therewith, and the resulting centrifugal force produces a large pressure gradient in the rotating liquid hydrogen 20 and a high discharge pressure at the second rotary orifices 144. The second rotary orifices 144 are preferably disposed at various axial locations so as to provide for improved mixing and combustion within the precombustor 34. Furthermore, a portion or all of the second rotary orifices 144 may be angulated relative to a radial direction. The locations, orientations, and sizes of the associated second rotary orifices 144 are adapted so that the rotor system 30 is mechanically balanced.

At normal flow rates, liquid hydrogen 20 does not completely fill either the annular duct 124 or the annular chamber 156, which collectively act as a vapor core pump. The second fluid passage 148 of the second rotary pressure trap 146 remains loaded with liquid hydrogen 20 so as to prevent backflow of high pressure vapor from the region downstream of the second rotary pressure trap 146.

The second hollow shaft portion 48 further comprises a shaft liner 162 having a closed end 164 and a second end 166, each respectively proximate to a first end 168 and a second end 170 of the second hollow shaft portion 48, wherein the closed end 164 of the shaft liner 162 is shaped so as to form a boundary 172 of a third rotary pressure trap 174. The third rotary pressure trap 174 comprises a third fluid passage 176 having an inlet 178 and an outlet 180 in fluid communication there through along a length thereof. The third fluid passage 176 is adapted by the boundary 172 so that when rotated about the axis of rotation 16 a centrifugal acceleration at any point within the third fluid passage 176 is greater than a centrifugal acceleration at either the inlet 178 or the outlet 180.

A third rotary injector 182, located within the main combustor 36 comprises at least one third rotary orifice 109 at the second end 170 of the second hollow shaft portion 48 in fluid communication with at least one second groove 106 and with the main combustor 36, wherein the at least one second groove 106 is in fluid communication with the outlet 180 of the third rotary pressure trap 174 in the fluid path from the oxygen scroll 26 that supplies liquid oxygen 18 to the third rotary orifice 109. The third rotary orifice 176 is coupled to the shaft 44, particularly to the fourth hollow shaft portion 104, and rotates with the shaft 44 about the axis 16 thereof.

In operation, liquid oxygen 18 from the pressurized oxygen tank 22 through the interior of the stationary tube 50 inside the first hollow shaft portion 46 discharges outwardly from the first throttling restriction 56 into the second hollow shaft portion 48 and is rotationally accelerated by the first inducer 64 causing the liquid oxygen 18 to rotate with the shaft 44. Resulting centrifugal forces pressurize the liquid oxygen 18 in proportion to the square of the radius from the center 70 of the shaft 44, causing the liquid oxygen 18 to flow along the inside surface of the second hollow shaft portion 48. Liquid oxygen 18 fills the third fluid passage 176 of the third rotary pressure trap 174, and with a sufficient shaft speed, the third fluid passage 176 remains sufficiently full of liquid oxygen 18 to isolate high pressures of the main combustor 36 downstream of the third rotary pressure trap 174 from the relatively low pressure of the liquid oxygen 18 upstream of the third rotary pressure trap 174.

In accordance with the teachings of U.S. Pat. No. 4,870,825,—incorporated herein by reference,—a rotary pressure trap comprises a fluid passage with an inlet and an outlet, wherein the fluid passage adapted so the when the rotary pressure trap is rotated, a centrifugal acceleration at any point within the fluid passage is greater than a centrifugal acceleration at any point on either the inlet or the outlet. Accordingly, when the fluid passage is filled with a relatively high density medium, such as a liquid, the radial levels of the inlet and outlet will be equal when there is no pressure differential therebetween, and will be otherwise unequal by an amount dependent upon the magnitude of the pressure differential and the speed of rotation. Accordingly, for a relatively low pressure liquid supply to an inlet of a rotary pressure trap feeding a relatively high pressure region at the outlet, the rotary pressure trap can prevent vapor from backflowing therethrough.

Accordingly, the first rotary pressure trap 86 isolates the liquid oxygen 18 at the inlet 80 of the first rotary injector 76 at the pressure of the main combustor 36 from the relatively higher pressure gases in the precombustor 34. Similarly, the second rotary pressure trap isolates the liquid hydrogen 20 in the annular duct 124 at the supply pressure from the relatively higher pressure gases in the precombustor 34. Moreover, the third rotary pressure trap 174 isolates the liquid oxygen 18 from the first throttling restriction 56 at the supply pressure from the relatively higher pressure gases in the precombustor 34.

Preferably, the second rotary orifices 144 discharge entirely within the precombustor 34. However, some of the second rotary orifices 144 may be adapted so as to discharge a bypass flow 185 of liquid hydrogen 20 through a first port 186 leading over the outside the precombustor liner 188 for purposes of cooling both the precombustor 34 and the main combustor 36. Up to 50% of the hydrogen flow may be directed outside the precombustor liner 188 and the remainder is discharged into the precombustor 34 proximate to the second rotary orifices 78 from which liquid oxygen 18 is discharged. The rotor system 30 rotating at a high angular speed imparts a substantial tangential velocity to the liquid hydrogen 20 and liquid oxygen 18 discharging therefrom, resulting in a well-mixed hydrogen/oxygen mixture within toroidal zones 190 within the precombustor 34, which maintains combustion once ignited by an igniter 192, such as a chemical torch or an electrical spark or plasma device.

A first portion 194 of the effluent 38 from the precombustor 34 flows through at least one first orifice 196 in the precombustor liner 188, into a first annular passage 198 at least partially surrounding the precombustor liner 188, through a second port 200 in the combustor liner support structure 202, into a second annular passage 204, through a plurality of effusion cooling holes 206 in the main combustor liner 208.

The effluent 38 from the precombustor 34 is a very rich (i.e., excess hydrogen) mixture at a moderate temperature— for example 1,200° F. A second portion 210 of the effluent 38 is directed through a lightly loaded single stage axial turbine 40 which develops substantially only sufficient power to drive the pumping means 32 inherent in the hydrogen and oxygen flow paths, wherein the pumping means 32 comprises the various inducers and the ribbed and vaned sections of the rotor system 30 that impart kinetic energy to the liquid oxygen 18 and the liquid hydrogen 20.

The pressure drop through the turbine 40 is sufficient to cause the the first portion 194 of the effluent 38 from the relatively higher pressure precombustor 34 to flow into the relatively lower pressure main combustor 36. The bypass flow 185 of liquid hydrogen 20 directed outside the precombustor liner 188 absorbs sufficient heat to cause that liquid hydrogen 20 to vaporize from the heat of the precombustor liner 188 and from the first portion 194 of the effluent 38 flowing into the precombustor liner 188.

The relatively rich second portion 210 of effluent 38 discharged from the turbine 40 into the main combustor 36 mixes with the relatively rich effusion cooling gases 212 from the effusion cooling holes 206, and with the liquid oxygen 18 that is rotationally discharged from the at least one third rotary orifice 109 so as to produce a high temperature effluent 214 necessary to achieve good propulsion efficiency. This high temperature effluent 214 is expanded through a converging/diverging nozzle 216 in a conventional fashion. The surface 218 of the converging/diverging nozzle 216 as far down as the nozzle throat 220 is cooled by the effusion cooling gases 212 flowing along the main combustor liner 208. The diverging portion 222 of the converging/diverging nozzle 216 is preferably lined with replaceable ablative material 224.

A small portion of the cold hydrogen vapor 226 from the annular chamber 156 flows through at least one second orifice 228 into a second annular chamber 230, then through at least one third orifice 232 in a splined bushing 234 supporting the turbine 40, through a third annular chamber 236 within the bushing 234, through at least one fourth orifice 238 in the bushing 234, into the turbine end bearing enclosure 240 to cool the foil first axial bearing 242, through a plurality of second labyrinth seals 244, and into the main combustor 36. The turbine end bearing enclosure 240 is also sealed from the precombustor 34 with a third labyrinth seal 246.

At least one annular buffer chamber filled with a pressurized inert gas 248, for example helium, is provided for isolating the first 18' and second 20' propellant components so as to prevent the formation of a flammable mixture therebetween at a location other than within the first 34' or second 36' combustion chambers. The pressure of the pressurized inert gas 248 in the at least one annular buffer chamber is higher than the pressure of either propellant component in a chamber adjacent thereto. Referring to FIG. 2a, a first annular buffer chamber 250 is adapted to receive a stream of pressurized inert gas 248, which is directed at a small impulse turbine 252 for starting the rocket engine 10. Pressurized inert gas 248 in a second annular buffer chamber 254 is sealed from the oxygen supply by a second seal 256, for example a carbon seal, between the first annular vent chamber 72 and the second annular buffer chamber 254. Pressurized inert gas 248 in a third annular buffer chamber 258 is sealed from the hydrogen supply by a third seal 260, for example a carbon seal, between the third annular vent chamber 138 and the third annular buffer 258 chamber. Pressurized inert gas 248 in at least one fourth annular buffer 262 chamber cools a foil second axial bearing 264 and foil first 266 and second 268 thrust bearings that bear against a thrust reaction rotor 270.

In an exemplary system, liquid hydrogen at approximately 40 psig. flowing from a pressurized tank at a flow rate of approximately 9.3 pounds per second to the precombustor reacts with liquid oxygen fed from a pressurized tank at approximately 40 psig at a flow rate of approximately 9.3 pounds per second to the precombustor to generate an effluent with a temperature of approximately 1300° F. at a pressure of approximately 220 psig. This effluent from the precombustor drives the turbine that imparts rotational kinetic energy to the liquid propellant components. The effluent from the precombustor then further reacts in the main combustor with an additional 41.8 pounds per second of oxygen to produce an effluent with a temperature of approximately 5400° F. at a pressure of approximately 200 psig., which provides approximately 25,000 pounds of thrust in a vacuum.

One of ordinary skill in the art will appreciate that the present invention can be readily adapted for liquid fuels other than liquid hydrogen, and liquid oxidizers other than liquid oxygen. Accordingly, if operated with liquid fuels that are relatively denser from the associated liquid oxidizer than liquid hydrogen is relative to liquid oxygen, the diameter of the annular chambers associated with the liquid fuel pumping and delivery system would be relatively smaller with respect to the diameter of the chamber/shaft carrying the liquid oxidizer. Moreover, the preferred geometry will depend upon the speed of operation and the associated properties of the propellant components at the operating pressures and temperatures.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A rocket engine, comprising:
   a. a first combustion chamber comprising
      i. an outlet; and
      ii. a first combustion chamber liner comprising at least one first orifice; and
   b. a first annular passage at least partially surrounding said first combustion chamber liner;
   c. a second combustion chamber in fluid communication with said outlet of said first combustion chamber, wherein said second combustion chamber comprises a second combustion chamber liner comprising at least one second orifice; and
   d. a second annular passage at least partially surrounding said second combustion chamber liner, wherein said second annular passage is in fluid communication with said first annular passage, whereby when operating, said first combustion chamber generates an effluent, a first portion of said effluent is discharged through said at least one first orifice, through said first and second annular passages, through said at least one second orifice, and into said second combustion chamber so as to provide for effusion cooling of said second combustion chamber liner.

2. A rocket engine as recited in claim 1, further comprising a flow restriction between said first and second combustion chambers, whereby when operating, a second portion of said effluent from said first combustion chamber flows into said second combustion chamber through said flow restriction so that a pressure in said first combustion chamber at said at least one first orifice is greater than a pressure in said second combustion chamber at said at least one second orifice.

3. A rocket engine as recited in claim 2, wherein said flow restriction comprises a turbine having an inlet and an outlet, said inlet is in fluid communication with said outlet of said first combustion chamber, and said second combustion chamber is in fluid communication with said outlet of said turbine, whereby said turbine is driven by at least a portion of said second portion of said effluent from said first combustion chamber.

4. A rocket engine as recited in claim 1, further comprising a source of a first propellant component, wherein said source of said first propellant component is in fluid communication with said first combustion chamber and with said first annular passage, whereby when operating, a portion of said first propellant component flows into said first annular passage, into said second annular passage, through said at least one second orifice, and into said second combustion chamber so as to provide for effusion cooling of said second combustion chamber liner.

5. A rocket engine as recited in claim 2, further comprising a source of a first propellant component, wherein said source of said first propellant component is in fluid communication with said first combustion chamber and with said first annular passage, whereby when operating, a portion of said first propellant component flows into said first annular passage, into said second annular passage, through said at least one second orifice, and into said second combustion chamber so as to provide for effusion cooling of said second combustion chamber liner.

6. A rocket engine as recited in claim 3, further comprising a source of a first propellant component, wherein said source of said first propellant component is in fluid communication with said first combustion chamber and with said first annular passage, whereby when operating, a portion of said first propellant component flows into said first annular passage, into said second annular passage, through said at least one second orifice, and into said second combustion chamber so as to provide for effusion cooling of said second combustion chamber liner.

7. A rocket engine as recited in claim 4, wherein said first propellant component comprises a fuel.

8. A rocket engine as recited in claim 1, further comprising a source of a second propellant component, wherein said source of said second propellant component is in fluid communication with said first combustion chamber, whereby when operating, a first portion of said second propellant component flows into said first combustion chamber, and a remaining second portion of said second propellant component flows into said second combustion chamber, wherein a temperature of combustion in said first combustion chamber is less than a temperature of combustion in said second combustion chamber.

9. A rocket engine as recited in claim 8, wherein said first propellant component comprises an oxidizer.

10. A rocket engine as recited in claim 8, wherein a ratio of said first to said second propellant components in said first combustion chamber is substantially fuel rich compared to a stoichiometric ratio.

11. A rocket engine as recited in claim 8, wherein said second portion of said second propellant component flows into said second combustion chamber at an intermediate location of said second combustion chamber so that the combustion of a first portion of said second portion of said effluent from said first combustion chamber is isolated from said second combustion chamber liner by an effluent selected from the group consisting of a second portion of said second portion of said effluent from said first combustion chamber, and said first portion of said effluent from said first combustion chamber.

12. A rocket engine as recited in claim 11, wherein said intermediate location is proximate to a central axis of flow through said second combustion chamber.

13. A rocket engine as recited in claim 4, further comprising a source of a second propellant component, wherein said source of said second propellant component is in fluid communication with said first combustion chamber, whereby when operating, a first portion of said second propellant component flows into said first combustion chamber, and a remaining second portion of said second propellant component flows into said second combustion chamber, wherein a temperature of combustion in said first combustion chamber is less than a temperature of combustion in said second combustion chamber.

14. A rocket engine as recited in claim 5, further comprising a source of a second propellant component, wherein said source of said second propellant component is in fluid communication with said first combustion chamber, whereby when operating, a first portion of said second propellant component flows into said first combustion chamber, and a remaining second portion of said second propellant component flows into said second combustion chamber, wherein a temperature of combustion in said first combustion chamber is less than a temperature of combustion in said second combustion chamber.

15. A rocket engine as recited in claim 6, further comprising a source of a second propellant component, wherein said source of said second propellant component is in fluid communication with said first combustion chamber, whereby when operating, a first portion of said second propellant component flows into said first combustion chamber, and a remaining second portion of said second propellant component flows into said second combustion chamber, wherein a temperature of combustion in said first combustion chamber is less than a temperature of combustion in said second combustion chamber.

16. A rocket engine as recited in claim 13, wherein said first propellant component comprises a fuel and said second propellant component comprises an oxidizer.

17. A method of cooling a rocket engine, comprising:
 a. generating effluent in a first combustion chamber by partial combustion of a plurality of propellant components, wherein said first combustion chamber has a first combustion chamber liner comprising at least one first orifice, said at least one first orifice is in fluid communication with a first region outside of said first combustion chamber liner;
 b. discharging a first portion of said effluent from said first combustion chamber into a second combustion chamber, wherein said second combustion chamber has a second combustion chamber liner, said first region outside of said first combustion chamber liner is in fluid communication with a second region outside of said second combustion chamber liner, said second combustion chamber liner comprises at least one second orifice between said second region and said second combustion chamber; and
 c. discharging a second portion of said effluent from said first combustion chamber through said at least one first orifice, through said first region and over the outside of at least a portion of said first combustion chamber liner, through said second region and over the outside of at least a portion of said second combustion chamber liner, through said at least one second orifice, and into said second combustion chamber, so as to provide for effusion cooling of said second combustion chamber liner.

18. A method of cooling a rocket engine as recited in claim 17, wherein said plurality of propellant components are concentrically discharged into said first combustion chamber.

19. A method of cooling a rocket engine as recited in claim 17, wherein said first portion of said effluent is discharged from said first combustion chamber into said second combustion chamber through a flow restriction, whereby a pressure of said effluent in said first combustion chamber at said at least one first orifice is greater than a pressure in said second combustion chamber at said second orifice.

20. A method of cooling a rocket engine as recited in claim 19, wherein said flow restriction comprises a turbine.

21. A method of cooling a rocket engine as recited in claim 17, wherein a temperature of combustion in said first combustion chamber is substantially less than a temperature of combustion in said second combustion chamber.

22. A method of cooling a rocket engine as recited in claim 17, wherein said plurality of propellant components comprise a fuel and an oxidizer, and a ratio of said fuel and said oxidizer in said first combustion chamber substantially fuel rich compared to a stoichiometric ratio.

23. A method of cooling a rocket engine as recited in claim 22, wherein a first portion of said fuel is discharged into said first combustion chamber, and a second portion of said fuel is discharged into said first region outside of said first combustion chamber liner.

24. A method of cooling a rocket engine as recited in claim 22, wherein a first portion of said oxidizer is discharged into said first combustion chamber and a second portion of said oxidizer is discharged into said second combustion chamber.

25. A method of cooling a rocket engine as recited in claim 24, wherein said second portion of said oxidizer is concentrically discharged into said second combustion chamber.

26. A method of cooling a rocket engine as recited in claim 24, wherein said second portion of said oxidizer is discharged at an intermediate location in said second combustion chamber.

27. A method of cooling a rocket engine as recited in claim 26, wherein said intermediate location is proximate to a central axis of flow through said second combustion chamber.

28. A method of cooling a rocket engine as recited in claim 24, further comprising modifying at least one characteristic of said first portion of said effluent from said first combustion chamber into said second combustion chamber by said operation of discharging said second portion of said oxidizer into said second combustion chamber, wherein said at least one characteristic is selected from the group consisting of a flow pattern and a mixture pattern.

29. A method of cooling a rocket engine as recited in claim 17, further comprising modifying at least one characteristic of said first portion of said effluent from said first combustion chamber into said second combustion chamber by said operation of discharging said second portion of said effluent through said at least one second orifice into said second combustion chamber, wherein said at least one characteristic is selected from the group consisting of a flow pattern and a mixture pattern.

\* \* \* \* \*